Aug. 21, 1934.　　　E. G. S. WAGNER　　　1,971,286
ANTISKID DEVICE
Filed July 25, 1933　　　2 Sheets-Sheet 1

Inventor
E. G. S. Wagner,

By Clarence A. O'Brien
Attorney

Aug. 21, 1934.  E. G. S. WAGNER  1,971,286
ANTISKID DEVICE
Filed July 25, 1933   2 Sheets-Sheet 2
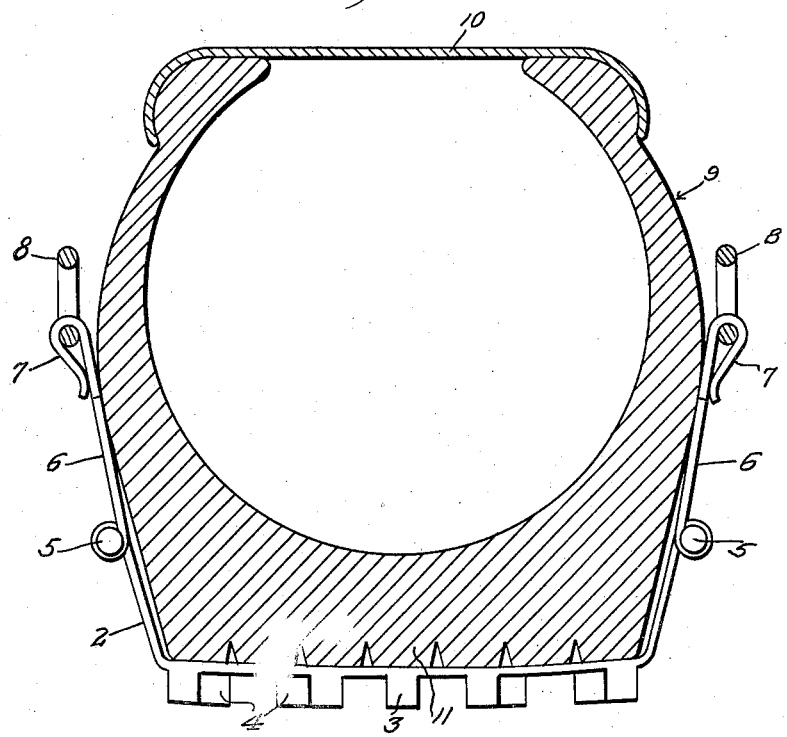
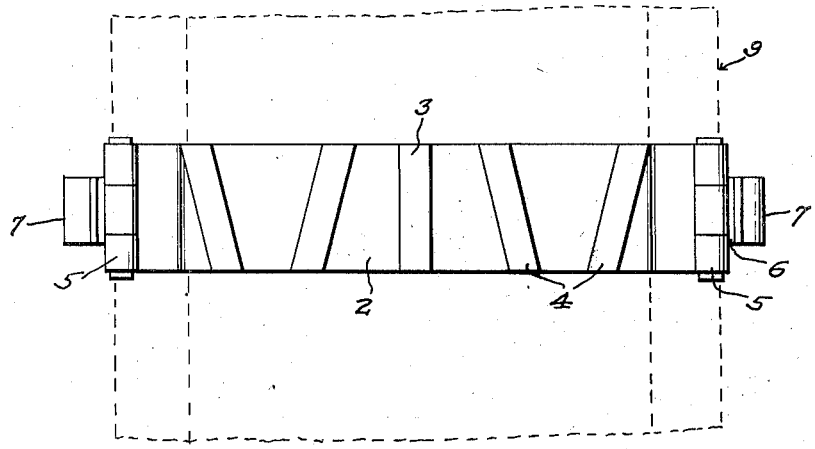
Inventor
E. G. S. Wagner,
By Clarence A. O'Brien
Attorney Patented Aug. 21, 1934

1,971,286

UNITED STATES PATENT OFFICE 1,971,286

ANTISKID DEVICE

E. Gilbert S. Wagner, Lewistown, Pa.

Application July 25, 1933, Serial No. 682,135

1 Claim. (Cl. 152—14)

The present invention relates to new and useful improvements in anti-skid devices for vehicle tires and has for one of its important objects to provide, in a manner as hereinafter set forth, a device of this character of the type including a plurality of transversely extending, substantially U-shaped tread plates having elongated lugs or ribs arranged thereon in a manner to prevent both lateral and longitudinal skidding.

Another very important object of the invention is to provide an anti-kid device including a pair of skid chains, and a plurality of transverse tread plates together with novel means for detachably connecting said tread plates to the side chains at spaced points.

Other objects of the invention are to provide an anti-skid device for vehicle tires which will be simple in construction, strong, durable, highly efficient and reliable in use, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a cross-sectional view, taken substantially on the line 3—3 of Figure 1.

Figure 4 is a plan view of one of the cross members.

Figure 1:
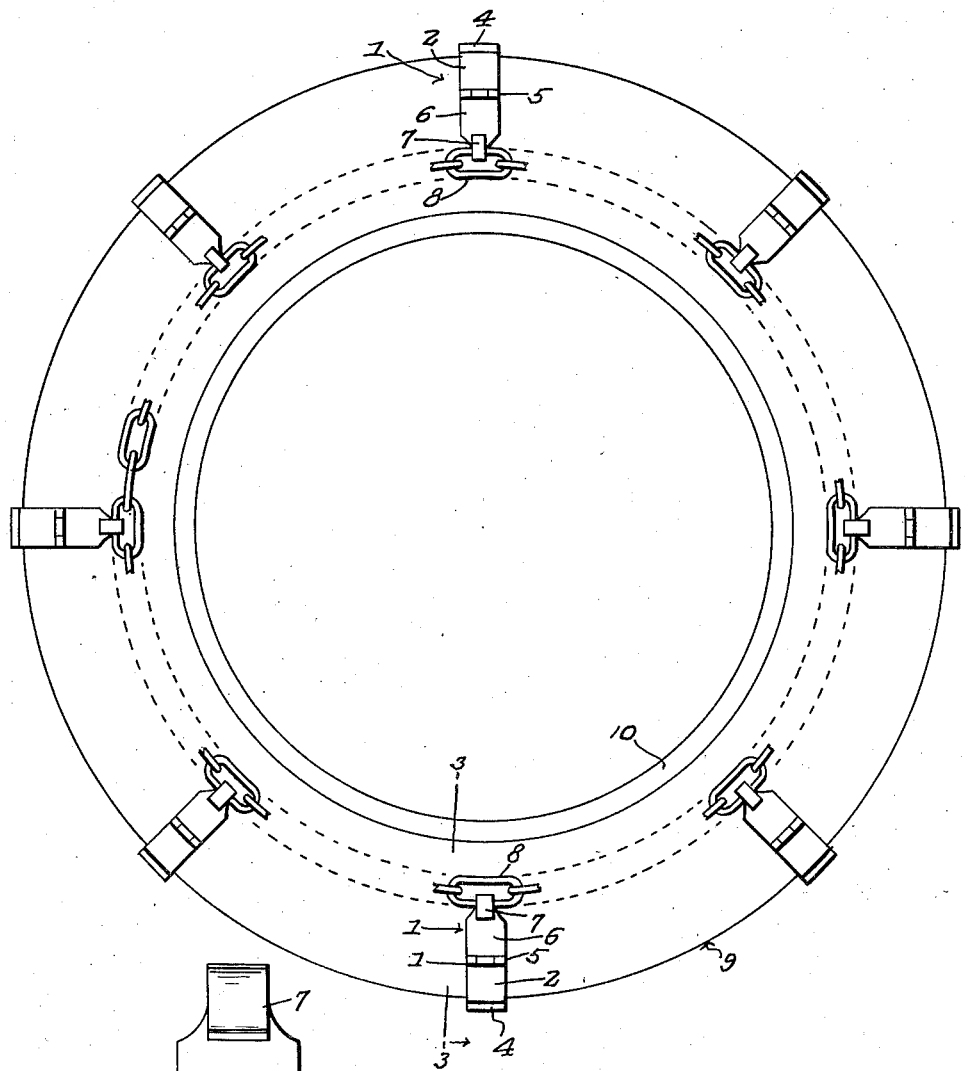
Figure 1 is a view in side elevation, showing a pneumatic tire equipped with an anti-skid device constructed in accordance with the present invention.
Figure 2:
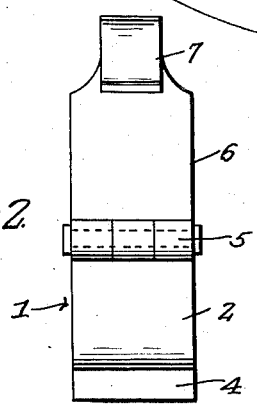
Figure 2 is a view in side elevation of one of the cross members constituting an essential feature of the present invention.

Referring now to the drawings in detail, it will be seen that the embodiment of the invention which has been illustrated comprises a plurality of cross members which are designated generally by the reference numeral 1. Each cross member 1 includes a substantially U-shaped metallic plate 2 having formed integrally with its tread portion a circumferentially extending intermediate rib 3 and pairs of diverging outer ribs 4. This is illustrated to advantage in Figure 4 of the drawings.

Hingedly connected, as at 5, to the ends of the tread plates 2 are hooks 6, the resilient bill portions 7 of which bear against the shank or plate portions of said hooks.

The hooks 6 are detachably connectable, at spaced points, to side chains 8 which extend adjacent the side walls of the tire, as will be understood. The reference numeral 9 designates generally a conventional pneumatic time mounted on a rim 10. The tread portion 11 of the tire 9 receives thereon the tread plates 2 of the cross members 1.

In use, the arrangement of the ribs 3 and 4 is such that lateral and longitudinal skidding will be substantially eliminated. The hook 6 may be connected with the side chains 8 by springing the bills 7 outwardly to permit passage of said side chains. The hooks then close for preventing accidental disconnection from the side chains.

It is believed that the many advantages of an anti-skid device constructed in accordance with the present invention will be readily understood, and although the preferred embodiment of the invention is as illustrated and described, it is to be understood that changes in the details of construction and in the combination of parts may be resorted to which will fall within the scope of the invention as claimed.

What is claimed is:—

A non-skid device of the class described comprising a substantially U-shaped member having a straight bight part for engaging a portion of the tread of a wheel and a plurality of lugs on the said bight part, each lug extending from one edge of the bight part of the other edge and each lug having straight side walls and a straight outer edge, the center lug extending circumferentially and the other lugs being arranged in pairs, one pair being located between the center lug and one end of the bight part and the other pair being located between said center lug and the other end of the bight part, each pair of lugs diverging from one edge of the bight part to the other edge.

E. GILBERT S. WAGNER.